(12) United States Patent
Norrman et al.

(10) Patent No.: US 9,838,879 B2
(45) Date of Patent: Dec. 5, 2017

(54) NETWORK NODE AND METHOD FOR DETECTING FALSE BASE STATIONS

(71) Applicant: Telefonaktiebolaget LM Ericsson (publ), Stockholm (SE)

(72) Inventors: Karl Norrman, Stockholm (SE); Angelo Centonza, Stockholm (SE); Marc Mowlér, Stockholm (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/902,508

(22) PCT Filed: Dec. 12, 2015

(86) PCT No.: PCT/EP2015/079764
§ 371 (c)(1),
(2) Date: Dec. 31, 2015

(87) PCT Pub. No.: WO2016/096836
PCT Pub. Date: Jun. 23, 2016

(65) Prior Publication Data
US 2016/0309332 A1    Oct. 20, 2016

Related U.S. Application Data

(60) Provisional application No. 62/094,098, filed on Dec. 19, 2014.

(51) Int. Cl.
*H04W 12/12* (2009.01)
*H04W 24/10* (2009.01)
(Continued)

(52) U.S. Cl.
CPC ............ *H04W 12/12* (2013.01); *H04L 67/18* (2013.01); *H04L 67/22* (2013.01); *H04W 12/10* (2013.01); *H04W 24/08* (2013.01); *H04W 24/10* (2013.01)

(58) Field of Classification Search
CPC ..... H04W 12/12; H04W 12/10; H04W 24/10; H04L 29/06
(Continued)

(56) References Cited

U.S. PATENT DOCUMENTS 6,799,044 B1 * 9/2004 Wesby .................. H04W 16/10
455/436
2004/0003285 A1 * 1/2004 Whelan ............... H04L 63/1408
726/23
(Continued)

FOREIGN PATENT DOCUMENTS

| EP | 1763178 A2 | 3/2007 |
|---|---|---|
| EP | 2661113 A1 | 11/2013 |
| WO | 2013133749 A1 | 9/2013 |

OTHER PUBLICATIONS

Nokia Corporation et al: "ANR Security Risk", 3GPP Draft; R2-105728 ANR Security, 3rd Generation Partnership Project (3GPP), Mobile Competence Centre ; 650, Route Des Lucioles ; F-06921 Sophia-Antipolis; France, vol. RAN WG2, No. Xi'an; 20101011, Oct. 5, 2010 (Oct. 5, 2010), XP050452692, [retrieved on Oct. 5, 2010] the whole document.
(Continued)

*Primary Examiner* — Edward Urban
*Assistant Examiner* — Ralph H Justus
(74) *Attorney, Agent, or Firm* — Rothwell, Figg, Ernst & Manbeck, P.C.

(57) ABSTRACT

A method performed by a network node (101), for detecting a false base station in a communications network (100). The network node (101) operates in the communication network (100) and is adapted to serve a network device (120) via a serving Radio Access, RA, node (110). The network node (110) sends a message to a network device (120), which message comprises configuration data configuring the network device (120) to perform measurements in order to
(Continued)

collect information transmitted by network nodes (110) in a surrounding area of the network device (120). The network node (110) further receives a message comprising measurement reports from the network device (120) according to the configuration. The network node (110) further provides an indication that a false base station is present when a difference between the received information in the measurement report and a predetermined target information is detected.

16 Claims, 7 Drawing Sheets

(51) Int. Cl.
*H04W 12/10* (2009.01)
*H04W 24/08* (2009.01)
*H04L 29/08* (2006.01)

(58) Field of Classification Search
USPC .................................................. 455/67.11
See application file for complete search history.

(56) References Cited

U.S. PATENT DOCUMENTS

| | | | | |
|---|---|---|---|---|
| 2007/0079376 A1* | 4/2007 | Robert | ................ | H04L 63/1408 726/23 |
| 2010/0267373 A1* | 10/2010 | Engstrom | ............ | H04J 11/0093 455/415 |
| 2012/0088505 A1* | 4/2012 | Toh | ...................... | H04W 8/186 455/434 |
| 2012/0106370 A1* | 5/2012 | Radulescu | ........ | H04W 36/0083 370/252 |
| 2012/0252521 A1* | 10/2012 | Nagaraja | ............. | H04W 52/243 455/522 |
| 2013/0331063 A1* | 12/2013 | Cormier | .............. | H04L 63/0272 455/411 |
| 2013/0344844 A1* | 12/2013 | Goldfarb | ............. | H04L 63/1408 455/411 |
| 2014/0087693 A1* | 3/2014 | Walby | ................. | B60R 25/2072 455/411 |
| 2014/0126403 A1* | 5/2014 | Siomina | ................ | H04W 24/10 370/252 |
| 2016/0198398 A1* | 7/2016 | Chen | ..................... | H04W 48/18 370/329 |

OTHER PUBLICATIONS

Michel Barbeau et al: "La detection 'de Fausses Stations de Base dans les Reseaux D'Acc GBP es Sans Fil WiMax/802.16; Rogue-base station detection in WiMax/802.16 wireless access networks", Annals of Telecommunications Annales Des Ta CR La CR Communications, Springer-Verlag, Paris, vol. 61, No. 11-12, Dec. 1, 2006 (Dec. 1, 2006) 4 pages 1300-1313, XP019968274, ISSN: 1958-'9395, DOI: 10.1007/9F03219898.

Notification of Transmittal of the International Search Report and the Written Opinion of the International Searching Authority or the Declaration cited in PCT/EP2015/079764 dated Feb. 19, 2016, 14 pages.

Adrian Dabrowski et al., "IMSI—Catch Me If You Can: IMSI-Catcher-Catchers", ACSAC' 14, Dec. 8-12, 2014, New Orleans, LA, 10 pages.

* cited by examiner

NETWORK NODE AND METHOD FOR DETECTING FALSE BASE STATIONS

CROSS REFERENCE TO RELATED APPLICATION

This application is a 35 U.S.C. 371 National Phase Entry Application from PCT/EP2015/079764, filed Dec. 15, 2015, the disclosure of which is incorporated by reference in its entirety.

TECHNICAL FIELD

Embodiments herein relate to a network node and a method therein. In particular, it relates to a method and a network node for detecting a false base station.

BACKGROUND

Communication devices such as mobile terminals are enabled to communicate wirelessly in a cellular communications network or wireless communication system, sometimes also referred to as a cellular radio system or cellular networks. The communication may be performed e.g. between two mobile terminals, between a mobile terminal and a regular telephone and/or between a mobile terminal and a server via a Radio Access Network (RAN) and possibly one or more core networks, comprised within the cellular communications network.

Mobile terminals may further be referred to as User Equipment (UE), wireless communication devices, wireless devices, wireless terminals, mobile stations, mobile telephones, cellular telephones, laptops, tablet computers or surf plates with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a radio network node, which typically is referred to as a base station. A cell is the geographical area where radio coverage is provided by the radio network node. The cellular communications network may be an LTE, E-UTRAN, WCDMA, GSM network, any 3GPP cellular network, WiMax, or any wireless network or system. In some embodiments the non-limiting term radio network node is more commonly used and it refers to any type of network node serving mobile terminal and/or connected to other network node or network element or any radio node from where mobile terminal receives signal. Examples of radio network nodes are Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, RRU, RRH, nodes in distributed antenna system (DAS) etc.

The radio network node may further control several transmission points, e.g. having Radio Units (RRUs). A cell may thus comprise one or more radio network nodes each controlling one or more transmission/reception points. A transmission point, also referred to as a transmission/reception point, is an entity that transmits and/or receives radio signals. The entity has a position in space, e.g. an antenna.

A network node is an entity that controls one or more transmission points. The network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

In some embodiments a more general term "network node" is used and it may correspond to any type of radio network node or any network node, which communicates with at least a radio network node. Examples of network nodes are any radio network node stated above; a core network node, such as e.g. a Mobile Switching Centre (MSC), a Mobility Management Entity (MME), an Operations & Management (O&M) node, an Operation, Administration and Maintenance (OAM) node, an Operations Support Systems (OSS) node, a Self-Organizing Network (SON) node, a positioning node, such as e.g. an Enhanced Serving Mobile Location Centre (E-SMLC), or a function related Minimization of Drive Tests (MDT) etc.

In some embodiments the non-limiting term network device is used and it refers to any type of wireless device communicating with a network node in a cellular or mobile communication system and being able to perform measurements on other network nodes in a surrounding or tracking area of the network device. Examples of a network device are UE, mobile terminal, target device, device to device UE, machine type UE or UE capable of machine to machine communication, PDA, iPAD, Tablet, mobile terminals, smart phone, Laptop Embedded Equipment (LEE), Laptop Mounted Equipment (LME), USB dongles, radio network node, radio access node etc.

Further, each network node may support one or several communication technologies. The network nodes communicate over the air interface operating on radio frequencies with the mobile terminals within range of the network node. In the context of this disclosure, the expression Downlink (DL) is used for the transmission path from the base station to the mobile station. The expression Uplink (UL) is used for the transmission path in the opposite direction i.e. from the mobile terminal to the base station.

In 3rd Generation Partnership Project (3GPP) Long Term Evolution (LTE), network nodes, which may be referred to as eNodeBs or even eNBs, may be directly connected to one or more core networks. In LTE the cellular communication network is also referred to as Evolved Universal Terrestrial Radio Access Network (E-UTRAN).

An E-UTRAN cell is defined by certain signals which are broadcasted from the eNB. These signals contain information about the cell which may be used by mobile terminals in order to connect to the network through the cell. The signals comprise reference and synchronization signals which the mobile terminal uses to find frame timing and physical cell identification as well as system information which comprises parameters relevant for the whole cell.

The architecture of an LTE system is shown in FIG. 1, including radio access nodes, e.g. base stations, such as e.g. eNBs, Home eNBs—HeNBs or HeNB GateWay (GW), and evolved packet core nodes, such as e.g. Mobility Management Entity (MME) or Serving GateWay (S-GW). As can be seen a S1 interface connects the HeNBs/eNBs to the MME/S-GW and HeNBs to the HeNB GW, while an X2 interface connects peer eNBs/HeNBs.

A management system LTE system of FIG. 1 is shown in FIG. 2. The Node Elements (NE) 200, which may also be referred to as eNodeBs or radio access nodes (base stations), are managed by a Domain Manager (DM) 210, which may also be referred to as an Operation and Support System (OSS). A DM 210 may further be managed by a network manager (NM) 220. Two NEs 200 are interfaced by an X2 interface, whereas the interface between two DMs 210 may be referred to as Itf-P2P. The management system may configure the NEs 200, as well as receive observations associated to features in the NEs 200. For example, a DM 210 observes and configures one or more NEs 200, while a NM 220 observes and configures one or more DM 210, as well as one or more NEs 200 via the one or more DMs 210.

By means of configuration via the DM 210, the NM 220 and their related interfaces, functions over the X2 and S1 interfaces may be carried out in a coordinated way throughout the RAN, eventually involving the Core Network, such as e.g. a MME and/or S-GWs.

FIG. 3 discloses a 3G architecture corresponding to the LTE architecture shown in FIG. 1. Here the Core Network is formed by nodes such as a Serving GPRS Support Node (SGSN) and a Mobile Switching Centre (MSC), which connect to a Radio Network Controller (RNC) and a Home NodeB (HNB) Gate Way (GW) via a Iu interface. The RNC connects to NodeBs (base stations) via a Iub interface while the HNB GW connects to the HNBs via a so called Iuh interface. HNBs may connect to each other via a so called Iurh interface, while RNCs connect to each other and to HNB GWs via a Iur interface.

The 3G OAM system follows the same structure as described for LTE shown in FIG. 2. The NEs 200 in FIG. 2 would correspond to RNCs and NBs in FIG. 3. If the NE is an HNB, the DM 210 would correspond to the HMS.

In LTE the mobile terminal may be in either idle state, which is also referred to as IDLE or RRC_IDLE, or in connected state, which state is also referred to as CONNECTED or RRC_CONNECTED. When the mobile terminal is in RRC_IDLE, it monitors a paging channel, which paging channel is part of a Common Control Channel (CCCH).

The suitable cell is commonly the cell with best quality of signal. Listening for a suitable cell may comprise searching for reference signals transmitted from the network node. When a suitable cell is found the mobile terminal performs random access, according to a system information for the cell. This is done in order to transmit a Radio Resource Control (RRC) connection setup request to the network node. Assuming the random access procedure succeeds and the network node receives the request, the network node will either answer with an RRC connection setup message, which acknowledges the mobile terminals request and tells it to move into RRC connected state, or an RRC connection reject, which tells the mobile terminal that it may not connect to the cell. In RRC connected state the parameters necessary for communication between the network node and the mobile terminal are known to both entities and a data transfer between the two entities is enabled.

When the mobile terminal is in RRC_CONNECTED state the mobile terminal may continue to measure RSRP, in order to be able to report a Channel Quality Indication (CQI) as well as an input to connected mode mobility decisions, such as e.g. performing a handover from one cell to another.

In order to support the mobile terminal in connecting to a cell, which may also be referred to as accessing a cell, System Information Blocks (SIBs) are transmitted in the control channel. A number of different SIBs are defined, which are characterized by the information they are carrying. For example, cell access related parameters, such as information about the operator of the cell, restrictions to what users may access the cell and the allocation of subframes to uplink/downlink may be carried by the SIBs.

However, a so-called "false base station" in a telecommunication system may impersonate a service providers real network nodes in order to lure a UE into connecting to the false base station. The false base station may then monitor and record data and voice traffic, as well as the position of the UE, which may be used to collect information about a user.

SUMMARY

It is an object of embodiments herein to provide a method for addressing issues outlined above.

According to a first aspect of embodiments herein, the object is achieved by a method, performed by a network node, for detecting a false base station in a communications network.

In one example herein, the network node operates in the communication network and is adapted to serve a network device via a serving Radio Access (RA) node. The network node may send a message to a network device, which message comprises configuration data configuring the network device to perform measurements in order to collect information transmitted by network nodes in a surrounding area of the network device. The network node may further receive a message comprising measurement reports from the network device according to the configuration. The network node further provides an indication that a false base station is present when a difference between the received information in the measurement report and a predetermined target information is detected.

According to a second aspect of embodiments herein, the object is achieved by a network node for performing the method for detecting a false base station in a communications network.

The network node operates in the communication network and is adapted to serve a network device via a serving Radio Access (RA) node. The network node is configured to send a message to a network device, which message comprises configuration data for configuring the network device to perform measurements in order to collect information transmitted by network nodes in a surrounding area of the network device. The network node is further configured to receive a message comprising measurement reports from the network device according to the configuration. The network node provide an indication that a false base station is present, when a difference between the received information in the measurement report and the predetermined target information has been detected.

The embodiments of the method described herein have the advantage that the implementation is very cost effective, since the implementation of the embodiments do not require a hardware upgrade of current communication networks, but only requiring a software upgrade of these. The software may e.g. be installed and/or updated in existing hardware remotely, which may also be referred to as from a location different than the location where the hardware is placed. Hence, there is no need for personnel to travel to the location of the hardware to perform the update, which reduces the costs for implementing the method described herein.

This allows an operator to collect and analyze data of the network surroundings in order to identify suspicious activity which may indicate a false base station raise an alarm when suspicious measurements.

A further advantage with the embodiments herein is that they allow a collection of measurements over a large coverage area, since each network device may perform measurements in the networks surroundings of the network device. Hence, a faster and more efficient detection of false base stations is provided.

The embodiments herein further allow the operator to gradually collect detailed data in narrowed down areas to enhance detection of false base stations, and thereby gradually raise a warning level by means of different levels of anomalies detections. Thereby, the operators are able to address a regulators' concerns regarding false base stations and IMSI catchers.

Moreover, the embodiments herein allow an operator to perform real-time collection and analysis of data directly from the communications network, in order to detect a false base station in a fast and efficient way.

BRIEF DESCRIPTION OF THE DRAWINGS

Examples of embodiments herein are described in more detail with reference to attached drawings in which.

DETAILED DESCRIPTION

Figure 1:
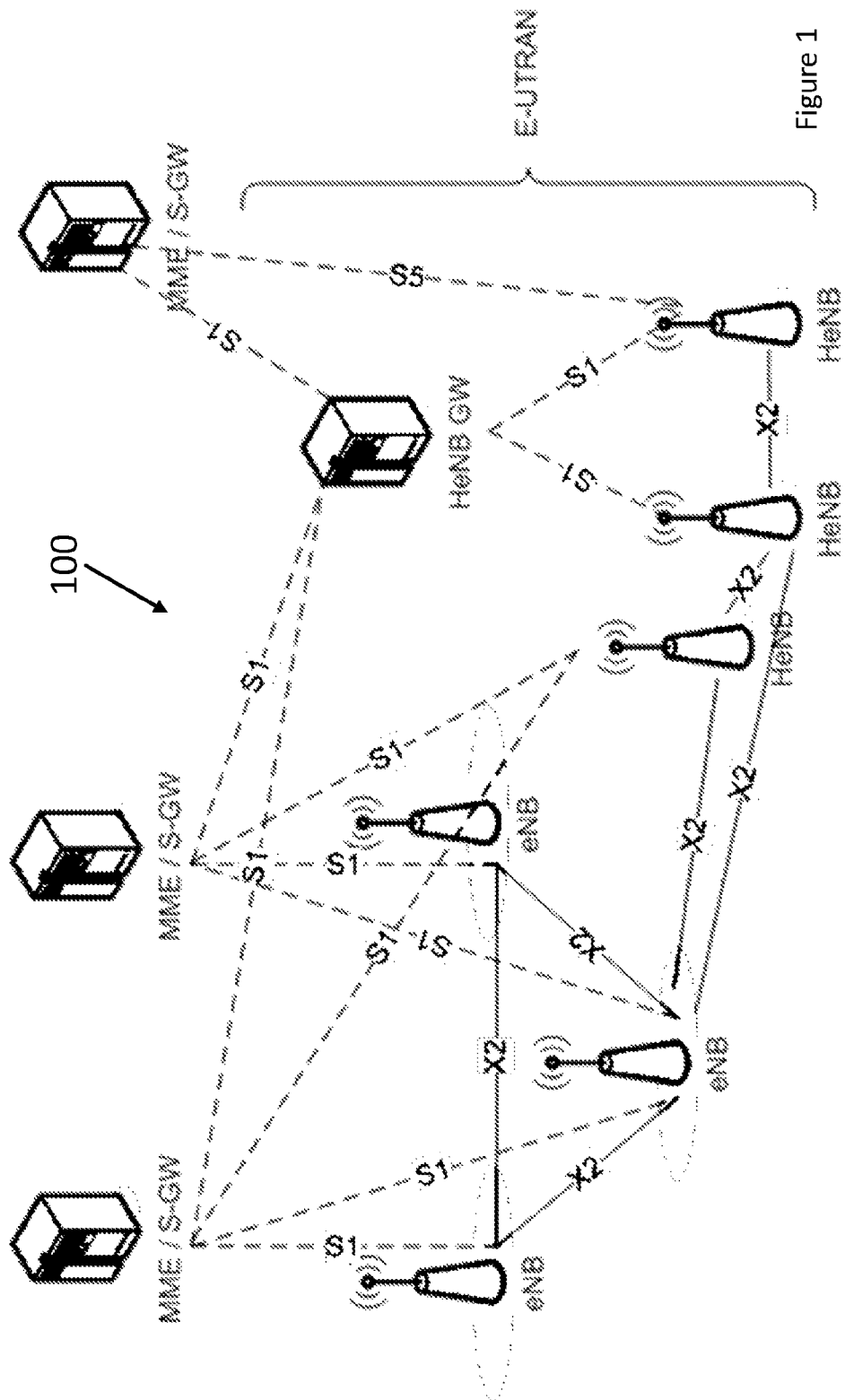
FIG. 1 is a schematic block diagram illustrating embodiments of an LTE wireless communications network.
Figure 2:
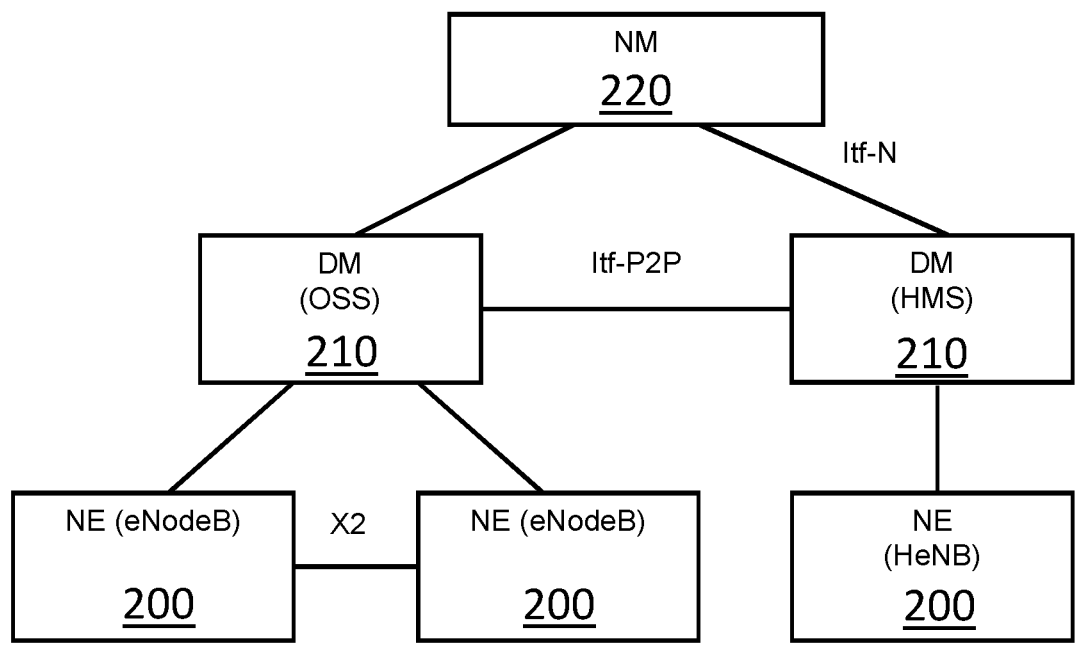
FIG. 2 is a schematic block diagram illustrating embodiments of a management system for a wireless communications network.
Figure 3:
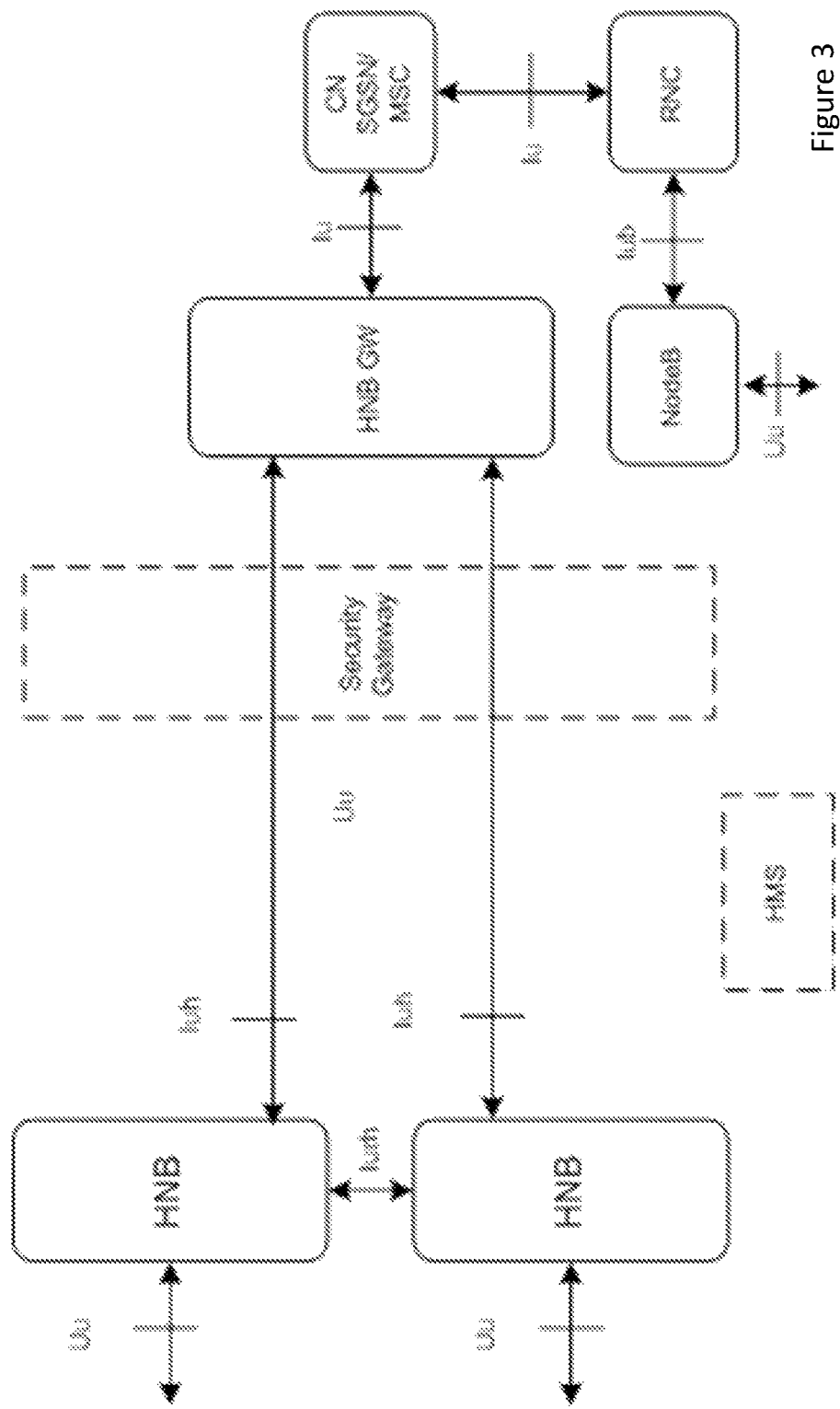
FIG. 3 is a schematic block diagram illustrating embodiments of an 3G wireless communications network.

Current telecommunication systems may be vulnerable to attacks from a false base station. The reason for this is that the mobile terminal may not determine whether requests for a long term mobile terminal identity, which applies to e.g. GSM, 3G and LTE RATs, or requests for use of no-encryption, which applies e.g. to GSM, comes from a legitimate network or not. It is hence difficult to prevent false base station attacks without large modifications to the radio protocols. The false base station may be any radio network node which may be able to serve a network device, such as a mobile terminal, and wherein the false base station may impersonate a legitimate network node towards the network device. Hence, the network device will interpret the false base station as a legitimate network node.

Nevertheless, false base station attacks do occur and it would be beneficial to have security controls to counter the attacks.

The class of attacks commonly referred to as false base station attacks comprises several different types of attacks. Two important types are the so called International Mobile Subscriber Identity (IMSI) catcher and the Man-In-The-Middle (MITM) attack. The purpose of the MITM attack is to act as an invisible proxy between the mobile terminal and the network to be able to eavesdrop on the mobile terminals calls. The IMSI catcher attack consists of requesting the long term identity from the mobile terminal. To accomplish the latter, the IMSI catcher impersonates a real network towards the mobile terminal, and requests the identity when the terminal tries to connect. The purpose of running an IMSI catcher is to track which users are present in a given area. It does however not eavesdrop on traffic.

A common component in all attacks in this class is that the false base station impersonates a legitimate network node towards the mobile terminal. To lure the mobile terminal to select a cell hosted by the false base station, the false base station may use a stronger signal. Thereby, the false base station appears more attractive to the mobile terminal. Alternatively, the false base station may disturb the frequency bands used by nearby legitimate base stations so that its own signal becomes stronger in comparison. Other methods to attract mobile terminals are based on broadcasting certain pieces of information that tricks the mobile terminal to believe it will receive better service from the false base station.

When the mobile terminal has selected a cell of the false base station, the mobile terminal will attempt to connect to the network represented by the false base station. Such a connection typically comprises sending a Location Area Update Request, a Tracking Area Update request or Attach Request message to the false base station. This is the exact same behavior the mobile terminal would show against a legitimate network. When connecting to a network, whether the network is legitimate or not, there may not be any security keys established between the network and the mobile terminal. For this reason, the mobile terminal must always accept that the network requests the long term identity International Mobile Subscriber Identity (IMSI) as part of the connection procedure. A legitimate network would obtain authentication information in the form of so-called Authentication Vectors from the subscriber's home network based on this IMSI, authenticate the mobile terminal and then activate security. A false base station, and an IMSI catcher in particular, makes use of this fact and sends an identity request in response to the mobile terminals connection attempt. Since the mobile terminal may not distinguish between the legitimate network and the false base station, the mobile terminal will reply with its IMSI unencrypted.

Once the false base station has retrieved the IMSI it may terminate the connection to the mobile terminal. There are several ways to achieve this; some are more graceful than others. The false base station may for example send a Location Area or Tracking Area Reject message indicating that the mobile terminal should try to connect to a different network. A cruder approach is to simply stop communicating with the mobile terminal after obtaining the IMSI.

Clearly, it is problematic that the mobile terminal may not distinguish between legitimate and non-legitimate networks. The fact that mobile terminals of 3GPP networks may not distinguish between legitimate and non-legitimate networks allows attackers to track the subscribers as they move, as well as eavesdrop on their calls and Short Message Service (SMS).

Within the 3rd Generation Partnership Project (3GPP), there have been discussions on how to prevent false base station attacks when the standardization of 3G began. There were however no countermeasures introduced for IMSI catching in 3G. When the standardization of LTE began, 3GPP once more discussed protection against IMSI catchers. Again no efficient protection was identified. It should be noted that 3G and LTE did include protection against eavesdropping false base stations of the MITM kind.

Examples of protection added to 3G and LTE to protect against MITM attacks include adding integrity protection to the negotiation and selection of encryption algorithms, mutual authentication between the mobile terminal and the network etc. These protection mechanisms may however not be back ported to GSM in an efficient way. The problem with doing that is that the system must be capable of handling legacy mobile terminals that do not have the new upgrades. Conversely, the mobile terminals must be capable of interworking with legacy networks that have not been upgraded accordingly. Since GSM does not have integrity protected capability negotiation between the mobile terminal and the network, an attacker may place itself as a MITM, relaying all traffic between the network and the mobile terminal, except for that the attacker modifies any capability information sent to indicate that one of the parties is a legacy entity that do not support the new functionality. The result of such bidding down attacks is that the mobile terminal and the network fall back to the legacy insecure behavior.

The best known way around the problem of bidding down attacks in the above setting is to introduce a cut-off date, after which legacy equipment will no longer be supported. The effect of this is that old mobile terminals will no longer be able to call, and new mobile terminals will no longer be able to connect to legacy networks. This is a severe restriction and when this approach is taken it is easy to see that the cut-off date will be pushed long into the future to avoid that customers are left without service.

One may also envision adding security functions to the protocols in GSM/3G/LTE for protecting the request for the IMSI from the network. However, adding such new functionality would have the same problem with bidding down attacks as identified in the previous paragraph.

A different approach may be to try to detect false base stations instead of preventing them from working. Once the false base stations are detected, they may be reported to the authorities, located, e.g., via triangulation, and removed. The IMSI catcher catcher project (ICC) (see https://opensource.srlabs.de/projects/mobile-network-assessment-tools/wiki/CatcherCatcher), is based on a detection principle. ICC is an open source software product that may be installed on an Android phone and which only works for GSM currently. ICC provides an indication of whether the mobile terminal may be connected to a false base station or not. The indication is either yellow, which indicates that the mobile terminal may be connected to a false base station, red, which indicates that there is strong evidence the mobile terminal is connected to a false base station, or black, which indicates that the mobile terminal is connected to a false base station for sure. A user may report to the authorities when ICC makes suspicious indications. While providing valuable information, a big drawback with this solution is that it requires more technical skill than the average user has. Other problems is that the tool is only likely to be used by a small set of security enthusiasts, meaning that continuous and wide coverage of the scans are not likely to happen. Further an operator needs to have assurance that appropriate measures are being taken and may not rely on the goodwill of the white hat hacker community. Even if the operator started using ICC in their own operations, it is in many regions prohibitively expensive to have personnel continuously moving around scanning the area.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

Also note that terminology such as network node and network device should be considering non-limiting and does in particular not imply a certain hierarchical relation between the two; in general "network node" may be considered as a first device, or device 1, and "network device" may be considered as a second device, or device 2, and these two devices may communicate with each other over a radio channel. The embodiments herein further focus on wireless transmissions in the downlink, however the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 4:
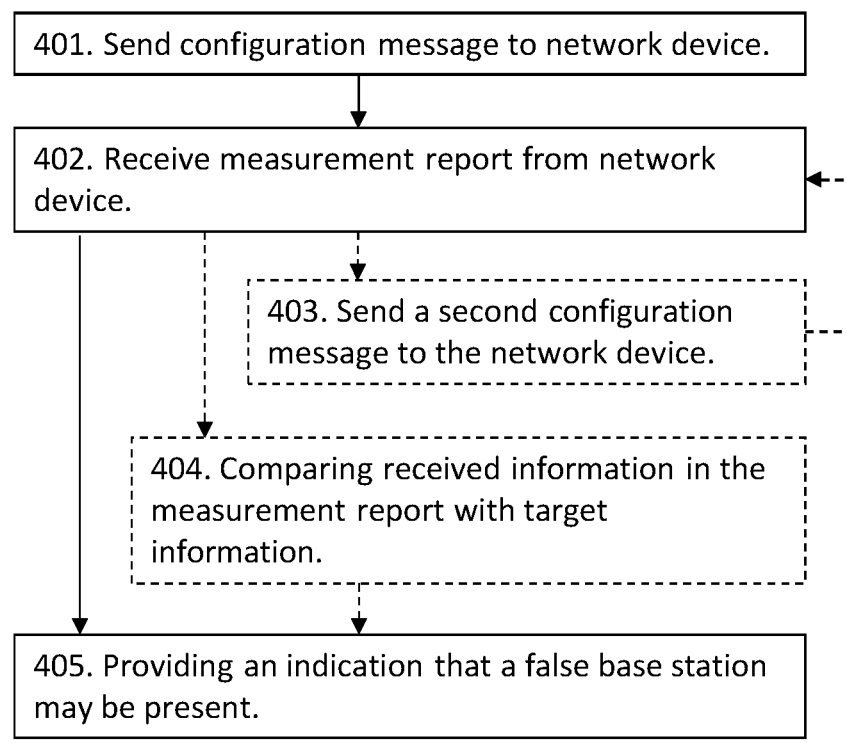
FIG. 4 is a flow chart illustrating embodiments of a method in a network node.

Example of embodiments of a method in a first network node for detecting false base stations, will now be described with reference to a flowchart depicted in FIG. 4.

An embodiment of the present invention comprises a method for detecting false base stations so that they may later be located and neutralized. The method may be applied to any type of radio access, however the main aim is to be able to detect false base stations of GSM, UMTS and LTE radio technologies. In particular GSM is of interest. All the methods collect data on the environment, which is then compared against the expected environment.

The method may comprise the following actions, which actions may be taken in any suitable order. Dashed lines of a box in FIG. 4 indicate that this action is not mandatory.

Action 401

The network node sends a message to a network device such as e.g. a radio network node, a radio base station or a mobile terminal, which message comprises configuration data configuring the network device to collect information transmitted by network nodes located in a surrounding area of the network device. This message may also be referred to as configuration message or measurement configuration message. The network nodes which the network device collects information from, may be any radio transmitter which the network device considers to be, which may also be referred to as interprets as, a network node, such as e.g. radio network nodes, radio base stations and/or false base stations impersonating a network node.

The information transmitted by the network nodes in the surrounding area of the network device may comprise physical cell identifiers, carrier frequency and/or pilot signal strength. The network node may configure the network device with a number of criteria on how to collect information and performing measurements, such as which frequencies to scan for, how frequently to scan, what physical cell identities to look for. The network node 110 may further be configured to request, or may configure the network device to measure on a larger set of frequencies than necessary for normal operation as well as on a plurality of different Radio Access Technologies (RATs), in order to collect information that may indicate the presence of a false base station. The information may thus be collected from frequencies and radio technologies not used when the network node 110 and network device communicate themselves, which may also be referred to as frequencies and radio technologies other than the ones used when the network node 110 and the network device communicate with each other.

In some embodiments herein the network device may be configured to collect information, which may also be referred to as perform measurements, based on, which may also be referred to as using, an Automatic Neighbor Relation (ANR) function.

Figure 5:
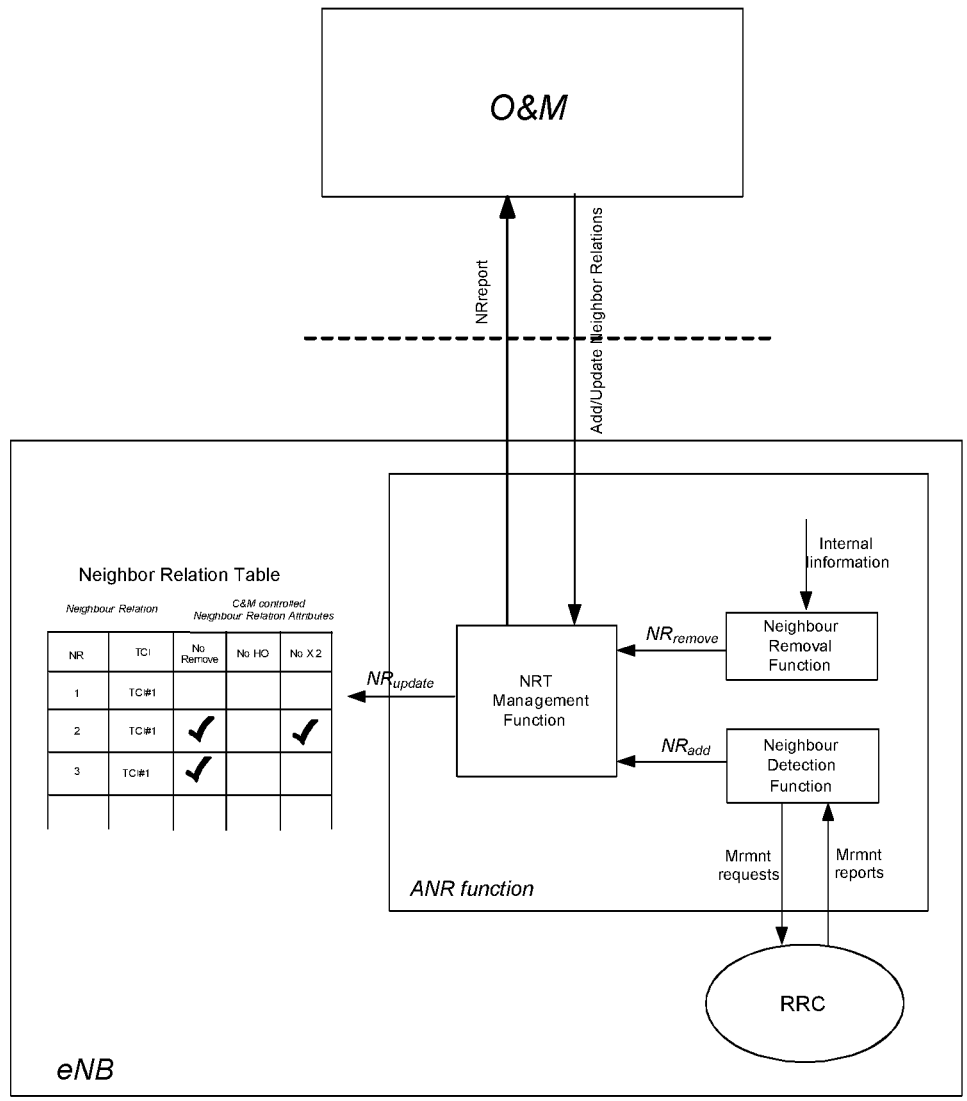
FIG. 5 is a schematic block diagram illustrating an ANR function according to some embodiments herein.

FIG. 5 shows the functionality of the ANR function and the interaction between a radio access node, such as an eNB, and an O&M. The ANR function allows the use of network device 120, such as a UE, reported measurements on neighbor cells to identify new neighbors and Neighbor Relations (NR) which may be eventually added to a Neighbor Relation Table (NRT) by a RAN node and/or by an OAM system.

The function works by means of collecting UE measurements reporting physical cell identifiers and other parameters concerning cells in a neighborhood, which may also be referred to as a tracking area. If a cell is unknown to the serving RAN node, the network node 110 may configure the network device, such as an UE, to perform further measurements to enable a reporting of information, such as e.g. the global cell identity.

The ANR function resides in the eNB and manages the conceptual Neighbour Relation Table (NRT). Located within ANR, the Neighbor Detection Function finds new neighbors and adds them to the NRT. ANR also contains the Neighbor Removal Function which removes outdated NRs. The Neighbor Detection Function and the Neighbor Removal Function may be implementation specific.

An existing Neighbor cell Relation (NR) from a source cell to a target cell means that eNB serving the source cell knows the E-UTRAN Cell Global Identifier (ECGI)/Cell Global Identifier (CGI) and the Physical Cell Identifier (PCI) of the target cell and has an entry in the NRT for the source cell identifying the target cell.

For each cell that the eNB serves, the eNB keeps a NRT. For each NR, the NRT contains the Target Cell Identifier (TCI), which identifies the target cell. For E-UTRAN, the TCI corresponds to the ECGI and Physical Cell Identifier (PCI) of the target cell.

The ANR function relies on cells broadcasting their identity on a global level, by means of the ECGI and allows the O&M to manage the NRT. The O&M may add and delete NRs. It may also change the attributes of the NRT. The O&M system may be informed about changes in the NRT.

For Intra-LTE/frequency ANR, the eNB serving a cell with ANR function, instructs each UE to perform measurements on neighboring cells, as a part of a normal call procedure. The eNB may use different policies for instructing the UE to perform measurements, and when to report the measurements to the eNB.

When the UE discovers an ECGI of a new cell, which may also be referred to as an unknown cell, the UE reports the detected ECGI to the serving cell eNB. In addition the UE reports the tracking area code and all Public Land Mobile Network Identities (PLMN IDs) that have been detected. The eNB adds this neighbor relation to NRT.

For Inter-RAT/Inter-frequency ANR, the eNB serving cell with ANR function may instruct a UE to perform measurements and detect cells on other RATs and/or frequencies during connected mode. The eNB may use different policies for instructing the UE to do measurements, and when to report them to the eNB.

The UE may report the PCI of the detected cells in the target RATs and/or frequencies to the eNB. When the eNB receives UE reports containing PCIs of cell(s), the eNB may instruct the UE to read the CGI and the RAC of the detected neighbor cell in case the detected cell is a GERAN cell, and CGI, LAC and, RAC in case the detected cell is an UTRAN cell. For the interfrequency case, the eNB may instruct the UE to read the ECGI, TAC and all available PLMN ID(s) of the inter-frequency detected cell.

The eNB may update its inter-RAT/inter-frequency Neighbour Relation Table after receiving relevant info from the UE.

The ANR function may signal the presence of a new neighbor relation to the OAM system, which in turn may signal the specific configurations regarding the newly detected neighbor cell to the RAN node. For example, the neighbor relation table may contain a "no HandOver (HO)" flag, a no X2 interface flag and a no remove flag, all of which may be configured by the OAM system.

In further embodiments herein, the network device may be configured to collect information, which may also be referred to as performing measurements, based on, which may also be referred to as using, an Minimization of Drive Tests (MDT) function.

Figure 6:
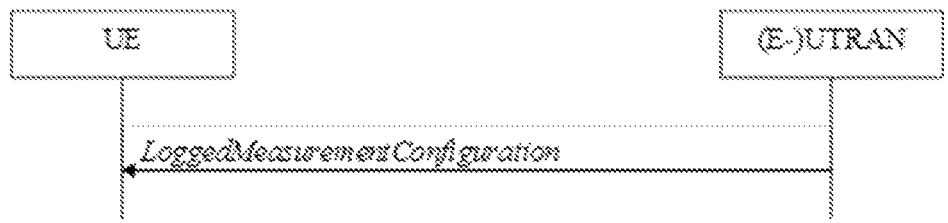
FIG. 6 is a signaling diagram depicting configuration of a MDT-test according to some embodiments.

The MDT function is an inter RAT function which allows a collection of events traces at a network device, such as a UE, upon configuration of the events to be monitored and collected from the network node 110, such as a RAN, to the network device. As an example, FIG. 6 shows how the RAN, which in this case is a UTRAN or an E-UTRAN node, sends to the UE an RRC message containing information on the events and information to store in the MDT trace.

The MDT trace stored may be retrieved by the network node 110, such as e.g. the RAN, via RRC signaling upon indication from the network device 120, such as an UE, that a logged trace is available.

Logged measurements may be of different type, some of them including:
  A physical cell identity, a pilot signal strength measurement and/or a carrier frequency of:
    a serving cell,
    intra-frequency neighbouring cells,
    inter-frequency neighbouring cells,
    GERAN neighbouring cells,
    UTRAN (if non-serving) neighbouring cells,
    E-UTRAN (if non-serving) neighbouring cells,
    CDMA2000 (if serving is E-UTRA) neighbouring cells,
  UE location information, at one of a number of time occurrences,
  RRC Connection Establishments per cell,
  Radio Link Failure events information.

Once the RAN retrieves an MDT trace it may report it to an OAM system, which may analyze it and derive corrective actions to enhance the system's performance.

It should be noted that a logging period may be specified by the RAN, implying that the UE may be requested to log the configured events while moving within a RAT and across several RATs and for a given time duration.

In some embodiments the network node 110 may be a serving RAN node, such as a radio network node.

In a further embodiment the network node 110 may send configuration messages to one or more network devices.

In a further embodiment of the embodiment based on the MDT function, further measurements may be configured to be reported in the logged measurements traces set by a function of the like of MDT. Such measurements may e.g. comprise:
  Logs of the number of IMSI retrieval attempts by the serving cell, or
  Logs of the number of Location Area Update procedures, or Tracking Area Update procedures or any procedure used to report change of UE location to the network Action 402

The network node 110 receives a message comprising a measurement report comprising collected information from the network device.

According to a first aspect of embodiments herein, the measurement report may be based on measurement reports that mobile terminals in connected state provide to the network node 110. Such measurement reports may be of the like of what is provided as part of the ANR function and may to identify cells in the neighbourhood which have been unknown to that point in time or with which a neighbour relation has not been established. The measurement report may contain information on physical cell identifiers, carrier frequency and pilot signal strength of cells in the network device's surroundings. Once the network device, such as a radio network node or a mobile terminal, collects measurements according to the measurement configuration provided by the network node 110 in the configuration message in Action 401, the terminal provides measurement reports back to the network node 110. The measurement reports may be event based, e.g. reported if one or more of the conditions specified in the measurement configuration is fulfilled, or may be provided on a regular basis, typically several times a second.

In a further embodiment the network node 110 may receive messages comprising measurement reports from one or more network devices.

According to a second aspect of embodiments herein, collection of information is based on a function in mobile networks that may be similar to or same as the Minimization of Drive Tests (MDT) function. The MDT function may activate log traces on a per-mobile terminal basis. The information logged by the terminal and stored in the traces may be of different kinds such as terminal collected measurements, initiated signaling procedures, monitored events that were previously defined, such as e.g. signals reaching pre-set thresholds. Activation of the log tracing function may be triggered by a number of events such as handovers of the mobile terminal to areas which should be scanned for detection of false bases stations, also referred to as rogue base stations, or detection of anomalies in the cell deployments based on the information received from the mobile terminals in connected state.

When the network node 110 activates log tracing in the network device 120, such as a mobile terminal, the mobile terminal starts to collect information related to the radio environment in its vicinity. The information may be collected while the network device 120 moves within the communications network. In some embodiments a first network node may activate the log traces function, the network device 120 then performs the measurement while moving within the communications network and may report the measurement to a second network node. The mobile terminal may collect a wide range of parameters, such as:

A physical cell identity, pilot signal strength measurements, and/or a carrier frequency of:
  a serving cell,
  intra-frequency neighbouring cells,
  inter-frequency neighbouring cells,
  GERAN neighbouring cells,
  UTRAN (if non-serving) neighbouring cells,
  E-UTRAN (if non-serving) neighbouring cells,
  CDMA2000 (if serving is E-UTRA) neighbouring cells;
a mobile terminal location information, at one of a number of time occurrences;
RRC Connection Establishments per cell;
Radio Link Failure events information; and/or
a handover event information.

The network node 110 may request the network device 120, such as the mobile terminal, to report the collected data either at the end of a pre-set log trace duration or in the middle of a logging period. Alternatively, the logs may be configured to collect and report on an event basis, in which case the log trace will be indicated by the terminal as ready to be retrieved as soon as the event to be monitored is recorded, such an event may e.g. occur when leaving a certain tracking area.

In some embodiments, the log traces may be triggered independently from any previous event, e.g. because an operator is interested in monitoring a given suspect area, or they may be activated as the consequence of events previously monitored, such as anomalies reported by means the measurement reports based on the ANR function. Therefore the MDT based embodiment described herein may function either in a standalone way or in a combined way together with other embodiments.

Action 403

In a further embodiment, the network node 110 may send a further message to the network device. The message may comprise configuration data configuring the network device to collect further measurements, which may also be referred to as collecting secondary information, from the detected cells. The message may be sent upon receiving measurement reports based on the first aspect of embodiments herein and/or upon detecting a difference between the received first information and the target information. The further measurements may also be based on the first aspect of embodiments herein, and may include decoding of common channels information such as System Information Blocks (SIBs), which may lead to reporting of parameters like a Cell Global Identity (CGI), a Location Area Code (LAC), a Tracking Area Code (TAC), a Closed Subscriber Group Identity (CSG ID) and more in the measurement report returned from the network device to the network node 110. Hence, the secondary information may be a SIB. The second information may be received by the network node 110 from the UE according to action 602 described above.

Action 404

The network node 110 compares the received information with a predetermined target information in order to determine differences between received and target information, which may also be referred to as determines anomalies in the received information. The anomalies may be determined, which may also be referred to as being detected, by comparing the received information with a predetermined target information, after having received the measurement report from the network device. The target information may be cell planning data, which may also be referred to as cell planning, cell planning information, cell plans, cell configuration or cell parameter configuration. With the terms cell planning, cell planning information, cell plans, cell configuration, cell parameter configuration and similar terms it is intended the set of data known by the network node 110 and providing information about the expected cell deployment and cell configuration as planned by an operator of the network.

An anomaly, also referred to as deviation or difference, between the received information and the predetermined target data may indicate the presence of a false base station. Hence, the network node 110 may detect the presence of a false base station by determining the anomalies in the received information.

When the measurement report is based on the ANR function, anomalies may consist of unexpected detection by the terminal of physical cell identities that were not supposed to be present in the neighborhood or measurement of unusually high pilot signal strength from neighboring cells. Such a presence of additional cell identities or unusually high pilot signal strength compared to the target information, may indicate the presence of a false base station. Hence, the difference between the received information and the target information may be detected based on the pilot signal strength or on a presence of additional cell identities.

The network node 110 receiving the measurement reports or any other network node 110 to which the measurement reports may be forwarded, may compare such results with a list of cells supposed to be present in the serving cell's neighborhood. The measurement reports may be forwarded without any modification of the measurement results or the measurement result may be processed and forwarded in the form of information deduced from the measurement report. The network node receiving the measurement report may be a radio network node and the network node to which the measurement reports may be forwarded to may be any other network node such as a core network node, such as e.g. MSC, MME, nodes related to O&M, OAM, OSS or SON, positioning node, such as e.g. E-SMLC, or a node related to MDT.

In case further measurements have been performed according to Action 603, anomalies may also be detected on the basis of such further reported information. This may be done by comparing the secondary information with a secondary target information. For example, an anomaly may consist of identifying a given TAC or LAC that is not supposed to be assigned to a cell with the reported physical cell identifier and CGI according to the predetermined target information. Hence, the comparison may comprise verifying that a given cell identifier and CGI in the secondary information are assigned to the same TAC or LAC as in the secondary target information.

The embodiment above may be used to trigger other procedures such as those described in other embodiments herein.

According to a second aspect of embodiments herein, the measurement report received by the network node 110 may be based on a function similar to or same as the Minimization of Drive Tests (MDT) function as described in Action 602. The anomalies that may be monitored, which may also be referred to as the differences between the received information and the target information that may be detected, in order to identify a false base station amongst the network nodes in the communications network, may be one or more of:

An unexpected and/or unknown physical cell identifier is monitored.

An unexpected and/or unknown CGI is monitored.

An unexpected and/or unknown LAC or TAC is monitored for the Physical Cell Identifier and/or CGI of the measured cell.

Unusually high pilot signal strength is monitored for a serving or neighbor cell. The latter measurement may be compared with pilot signal strength of other neighboring cells. In some embodiments, if the signal strength of a cell serving the network device is within normal ranges but a neighbor pilot signal strength is higher than expected, given the serving signal strength power, the neighbor signal strength may be deemed anomalous. In a similar way, if the monitored neighbor cells signal is within expected ranges, but the serving signal strength is higher than expected, given the serving signal strength power, the serving signal strength may be deemed anomalous.

An unusual sequence of signaling procedures is triggered, such as for example:

RRC connection attempts to unexpected monitored cells.

RRC Connection attempts not followed by handover procedures but followed by new RRC attempts in a different cell. This may indicate that the UE was not properly handed over by a possibly false base station, which may also be referred to as a rogue base station, but instead was dropped, which may also be referred to as was released, from the base station and let to re-connect to a new cell.

RRC Connection attempts followed by Radio Link Failures (RLFs) while the signal strength of the serving cell is reasonably high, i.e. such a signal strength which normally would not be the cause of an RLF.

The network node 110, e.g. the OAM system, may also be aware of the base station type corresponding to a given cell identifier monitored and reported by the network device in the log traces. Namely, the network node 110 may be aware that a certain cell identifier corresponds to a certain cell, such as e.g. a pico cell, and that transmission power for such a cell may not exceed a given threshold. The value of the threshold may be dependent on the capabilities of the RAT used, such as e.g. the maximum transmission power which the network node are being designed for. The value of the threshold may further be dependent on the network devices distance to the network node 110, where the threshold value may be a scaling of the maximum transmission power of the network node serving the cell, such that the threshold is decreases with an increasing distance between the network device 120 and the network node. In some embodiments herein the threshold may further be dependent on the physical environment in which the network node serving the cell is placed. Based on the above, it will be obvious to a person skilled in the art how the threshold should be selected. In some embodiments herein the threshold may be e.g. 24 dBm. Hence, a transmission power measured from a cell which is exceeding the threshold may be an indication of a false base station. In some further embodiments herein, the same comparison may be performed using the pilot signal strength instead of the transmission power, or the measured pilot signal strength may be an indication of the transmission power. Therefore an anomalous pilot signal strength may also be deduced by the comparison between the logged measurements for a cell and the expected pilot signal strength given the known cell type of the cell.

Action 405

The network node 110 provides an indication that a false base station may be present when the collected information differs from the target information, or if there is a deviation or anomaly between the logged data and the data expected from cell planning and configuration. The indication may be provided by triggering an alarm, which may raise the alert level, or raising a warning message providing an alert on a possible presence of a false or rogue base station in the area.

In a further embodiment, the radio network nodes in the network may be configured to collect information without relying on the support of mobile terminals. Hence, in this embodiment the network device may be a radio network node.

As stated in previous embodiments, this information may comprise physical cell identifier, carrier frequency or pilot signal strength measurements for cells in the neighborhood. Additionally the information collected may comprise common channels information such as SIBs and comprising parameters like LAC, TAC, CGI or CSG ID.

In this case, the base stations may be configured to receive signals from surrounding network nodes, which may also be referred to as base stations. The signals may be interpreted on an abstract level, i.e. the base station receiving the signal uses it only based on with which power a signal on a given frequency is present. The receiving radio network node or a different network node, to which the measured information may be forwarded, compares a received signal power pattern to the expected signal power pattern according to the cell planning information, which indicate the expected cells present in the neighborhood.

An alternative approach is to interpret the signals more concretely. That is, the receiving radio network node parses the received signals as radio protocols and deduces more granular information about the transmitter. For example, the receiving radio network node may listen for cell identifiers broadcast by neighboring radio network nodes. The received information may again be compared with the expected result according to the cell planning.

In a further embodiment, a GSM only case may be applied as a special case of the above embodiments. The mobile terminal may measure downlink received signal level from the serving cell and received signal level from surrounding cells.

A MEASurement RESult (MEAS RES) procedure may be used by the radio network node, such as a BTS, to report the measurements made by the network device 120, such as e.g. a Mobile Station, to a network node, such as e.g. a Base Station Controller (BSC). One of the measurements is encompassed in RxLev parameter, which is a measure of the signal strength. The MEAS RES procedure is specified in 3GPP TS 48.058 V12.0.0 and the RxLev parameter is specified in 3GPP TS 45.008 V12.3.0.

The decision if a false base station is may be made by the network node 110, such as the BSC, where e.g. a value of RxLev=63 may indicate an interfering IMSI catcher.

The network node 110, such as the BSC, may also combine measurement reports from several BTS/mobile terminals, and may use a statistical approach to calculate the probability that a RxLev value correlates with an IMSI catcher.

In all of the embodiments, the comparison of the received data against the expected outcome may be performed in a radio network node, or in another network node to which the radio network node may forward the data, such as e.g. a core network node, a node in the OAM system or a distributed node. The node in the OAM system may collect data from several different radio network nodes and perform a statistical analysis over a combined set of data. Hence, the collected information and the target information may be averaged over a plurality of network devices. When the data is collected by another node in the OAM system, it is not necessary that this node itself provides an indication of a suspected false base station. Instead the OAM system may provide the indication or take an action based on a corresponding analysis of the received collected data.

Although the expected values are represented by the cell plan in the above description, it is clear that other measures of what to be expected may also be used. For example, a general signaling strength as mandated by regulators is not exceeded by a legitimate base station, but may be exceeded by a false base station trying to attract mobile terminals. Hence, if a measured signaling strength from one of the network nodes is higher than a threshold, which threshold may be the signaling strength mandated by regulators, this network node is identified as possibly being a false base station. In order to confirm that the network node being identified as a possible false base station actually is a false base station, further measurements may be performed according to the embodiments described above.

In some embodiments herein, the difference between the collected information and the target information may be averaged over a plurality of network devices, or over a plurality of measurements made by a single network device, or over a plurality of measurements made by a plurality of network devices.

Embodiments herein are written from the perspective that the network node performing the analysis is a radio base station, which may also be referred to as a radio network node. However, the radio base station may just as well forward the data for analysis in a more central node that performs the comparisons and raises an indication or take some other action when a suspected false base station is identified.

A core network node, such as an OAM node, may also be adapted to configure a radio network node to perform the measurements for collecting information transmitted by network nodes in a surrounding, which may also be referred to as a tracking area, of the radio network node. The radio network node may send a measurement report to the core network node, which core network node may determine anomalies in information received in the measurement report.

In a further embodiment the core network node, such as an OAM node, may also be adapted to configure a radio network node to configure a network device to perform the measurements for collecting information transmitted by network nodes in a surrounding area, which may also be referred to as a tracking area, of the network device 120. The network device 120 may send a measurement report to the radio network node, which may forward the report to a core network node. Anomalies in the information received in the measurement report may be determined by the core network node.

In some embodiments herein, the configuration may be triggered by an event, which event may be a handover or a detection of a pilot signaling strength exceeding a threshold value. Herein, configuration shall be interpreted as the configuring of the network device 120. Hence, the performing of the method disclosed herein, according to actions 401 to 405, may also be triggered by the same events, such as a handover or a detection of a pilot signaling strength exceeding a threshold value.

According to a further aspect of embodiments herein, the object may be achieved by a method, performed by a network device 120, for detecting false base stations.

In one embodiment herein, the network device 120 may receive a message comprising configuration data from a network node 110.

The network device 120 may further perform measurements according to the received configuration data, in order to collect information transmitted by network nodes in a tracking area of the network device 120. The network nodes may be any radio transmitter which the network device considers to be, which may also be referred to as interprets as, a network node, such as e.g. radio network nodes, radio base stations and/or false base stations impersonating a network node.

The network device 120 may further send a message comprising a measurement report comprising collected information to the network node 110.

Figure 7:
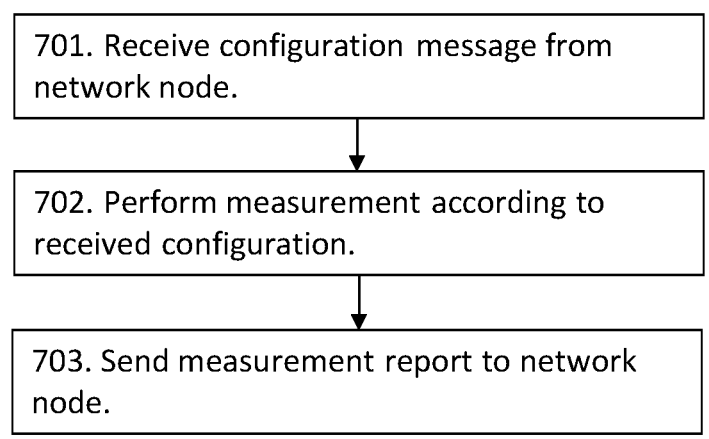
FIG. 7 is a flow chart illustrating embodiments of a method in a network device.

Example of embodiments of a method in a network device 120 for detecting false base stations in a communications network 100, will now be described with reference to a flowchart depicted in FIG. 7.

The method may comprise the following actions, which actions may be taken in any suitable order. Dashed lines of a box in FIG. 7 indicate that this action is not mandatory.

Action 701

The network device 120 may receive a message comprising configuration data from the network node 110, which message comprises configuration data configuring the network device to collect information transmitted by network nodes in a surrounding area of the network device.

Action 702

The network device 120 may perform measurements according to the received configuration data, in order to collect information transmitted by the network nodes in the tracking area of the network device 120. The measurements may be based on the ANR function or the MDT function.

Action 703

The network device 120 may further send a message comprising the measurement report comprising collected information to the network node 110.

Figure 8:
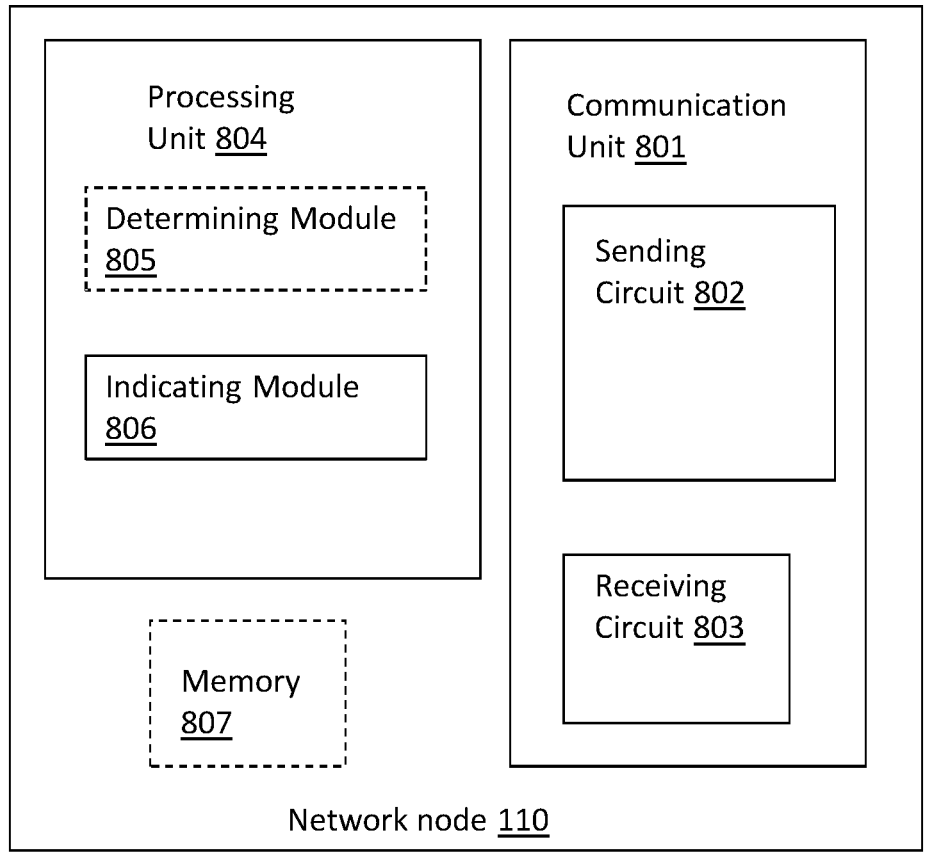
FIG. 8 is a schematic block diagram illustrating a network node according to some embodiments herein.

To perform the method actions for detecting false base stations described above in relation to FIG. 4, the network node 110 may comprise the following arrangement depicted in FIG. 8.

The network node 110 comprises a communication unit 801 to communicate with network devices. The communication unit 802 may e.g. be an X2 or an S1 interface.

The network node 110 is configured to, e.g. by means of a sending circuit 802 being configured to, send a message to a network device, which message comprises configuration data configuring the network device to collect information transmitted by other radio sources. The network node 110 is further configured to, or comprises a receiving circuit 803 configured to, receive a message comprising a measurement report comprising collected information from the network device.

The network node 110 may further be configured to, e.g. by means of a determining module 805 further being configured to, determine anomalies in the received information. The anomalies may be determined, which may also be referred to as being detected, by comparing the received information with a predetermined target information, after having received the measurement report from the network device. The target information may be cell planning data, which may also be referred to as cell planning, cell planning information, cell plans, cell configuration or cell parameter configuration. With the terms cell planning, cell planning information, cell plans, cell configuration, cell parameter configuration and similar terms it is intended the set of data known by the network node or OAM node and providing information about the expected cell deployment and cell configuration as planned by an operator of the network.

In another embodiment herein the network node 110 may further be configured to, e.g. by means of an indicating module 806 further being configured to, provide an indication that a false base station may be present when the collected information differs from the target information, or if there is a deviation or anomaly between the logged data and the data expected from cell planning and configuration.

The embodiments herein for detecting false base stations may be implemented through one or more processors, such as the processing unit 804 in the network node 110 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 807 comprising one or more memory units. The memory 807 is arranged to be used to store obtained information, measurements, data, configurations, schedulings, and applications to perform the methods herein when being executed in the network node 110.

Figure 9:
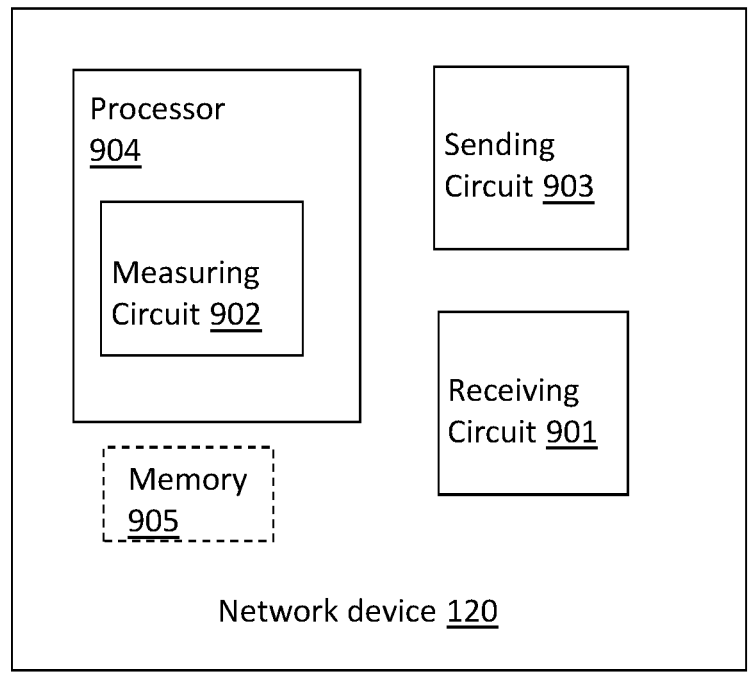
FIG. 9 is a schematic block diagram illustrating a network device according to some embodiments herein.

To perform the method actions for detecting false base stations described above in relation to FIG. 7, the network device 120 may comprise the following arrangement depicted in FIG. 9. The network device 120 may be configured to, e.g. by means of a receiving circuit 901 being configured to, receive a message from the network node, which message comprises configuration data configuring the network device to collect information transmitted by other radio sources.

The network device 120 may further be configured to, or comprises a measurement circuit 902 configured to, perform measurements according to the received configuration data, in order to collect information transmitted by network nodes in the tracking area of the network device.

The network device 120 may further be configured to, or comprises a sending circuit 803 configured to, send a message comprising a measurement report comprising collected information from the network device 120.

The embodiments herein for detecting a false base station may be implemented through one or more processors, such as the processing unit 904 in the network device 120 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the network node 120. One such carrier may be in the form of a CD ROM disc. It is however feasible with other data carriers such as a memory stick. The computer program code may furthermore be provided as pure program code on a server and downloaded to the network node 120.

The network device 120 may further comprise a memory 905 comprising one or more memory units. The memory 905 is arranged to be used to store obtained information, measurements, data, configurations, scheduling, and applications to perform the methods herein when being executed in the network node 120.

Those skilled in the art will also appreciate that the determining module 805, the indicating module 806 and the measuring circuit 902 described above may refer to a combination of analog and digital circuits, and/or one or more processors configured with software and/or firmware, e.g. stored in the memory 807, that when executed by the one or more processors such as the processing unit 804 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

When using the word "set" herein, it shall be interpreted as meaning "one or more".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node for detecting a false base station in a communications network, the method comprising:
   sending a first message to a network device, which first message comprises first configuration data configuring the network device to perform measurements in order to collect first information transmitted by network nodes in a surrounding area of the network device,
   receiving a first measurement report from the network device according to the first configuration,
   sending a second message to the network device configuring the network device to collect secondary information,
   receiving the secondary information from the network device,
   detecting the presence of a false base station based on a difference between the received secondary information and predetermined target information.

2. The method according to claim 1, wherein the method performed by the network node further comprises:
   comparing the received secondary information with predetermined target information in order to detect differences between the secondary information and the predetermined target information.

3. The method according to claim 2, wherein the method performed by the network node further comprises:
   detecting a difference between the received first information and predetermined target information that is different than the target information to which the secondary information is compared.

4. The method according to claim 3, wherein the difference between at least one of the first information and the secondary information and the respective target information is detected based on the difference of the pilot signal strength.

5. The method according to claim 3, wherein the difference between at least one of the first information and the secondary information and the respective target information is detected based on a presence of a cell identity in the received information which is not present in the target information.

6. The method according to claim 3, wherein the difference between at least one of the first information and the secondary information and the respective target information is averaged over a plurality of network devices, and/or over a plurality of measurements made by a single network device, and/or over a plurality of measurements made by a plurality of network devices.

7. The method according to claim 2, wherein the comparison may comprise verifying that a given cell identifier and Cell Global Identity in the secondary information are assigned to the same Tracking Area Code or Location Area Code as in the secondary target information.

8. The method according to claim 1, wherein at least one of the first information and the secondary information comprises physical cell identifiers, carrier frequencies and pilot signal strengths.

9. The method according to claim 1, wherein at least one of the first information and the secondary information is collected from frequencies and radio technologies not used when the network node and network device communicate themselves.

10. The method according to claim 1, wherein the target information is cell planning data.

11. The method according to claim 1, wherein the secondary information is a System Information Block.

12. The method according to claim 1, wherein the network node configures the network device to perform measurements based on a Minimization to Drive Test function.

13. The method according to claim 1, wherein the network node configures the network device to perform measurements using an Automatic Neighbor Relation function.

14. The method according to claim 1, wherein the configuration is triggered by an event, which event is a handover or a detection of a pilot signaling strength exceeding a threshold value.

15. A network node for use in detecting a false base station in a communications network, wherein the network node is configured to:
   send a message to a network device, which message comprises configuration data for configuring the network device to perform measurements in order to collect information transmitted by network nodes in a surrounding area of the network device;
   receive a measurement report from the network device according to the configuration, wherein the measurement report comprises a physical cell identifier (PCI) that the network device determined from synchronization signals received by the network device, wherein the synchronization signals were transmitted by a base station;
   determine whether the base station is a false base station based on the PCI reported by the network device; and
   provide an indication that a false base station is present as a result of determining that the base station is a false base station.

16. The network node according to claim 15, wherein the network node is configured to determine whether the base station is a false base station based on the PCI reported by the network device by performing a process comprising determining whether the PCI reported by the network device is included in a list of PCIs maintained by the network node.

* * * * *